(12) United States Patent
Zhu

(10) Patent No.: US 8,909,295 B2
(45) Date of Patent: Dec. 9, 2014

(54) TRANSCEIVER SET SELECTION AND COMMUNICATION SCHEME FOR A DISTRIBUTED ANTENNA SYSTEM

(75) Inventor: Chenxi Zhu, Fairfax, VA (US)

(73) Assignee: Fujitsu Limited, Kawasaki-shi (JP)

( * ) Notice: Subject to any disclaimer, the term of this patent is extended or adjusted under 35 U.S.C. 154(b) by 321 days.

(21) Appl. No.: 13/362,842

(22) Filed: Jan. 31, 2012

(65) Prior Publication Data
US 2012/0220333 A1    Aug. 30, 2012

Related U.S. Application Data

(60) Provisional application No. 61/446,951, filed on Feb. 25, 2011, provisional application No. 61/446,954, filed on Feb. 25, 2011.

(51) Int. Cl.
*H04M 1/00* (2006.01)
*H04B 7/06* (2006.01)
*H04B 7/02* (2006.01)

(52) U.S. Cl.
CPC .............. *H04B 7/024* (2013.01); *H04B 7/061* (2013.01)
USPC ....................................... 455/562.1; 455/423

(58) Field of Classification Search
USPC ..................... 455/404.2, 408, 13.1
See application file for complete search history.

(56) References Cited

U.S. PATENT DOCUMENTS

| | | |
|---|---|---|
| 2006/0276227 A1 | 12/2006 | Dravida |
| 2011/0070918 A1* | 3/2011 | Hafeez .................. 455/522 |
| 2011/0105184 A1* | 5/2011 | Piirainen et al. .......... 455/562.1 |
| 2011/0244887 A1* | 10/2011 | Dupray et al. ............ 455/456.2 |

FOREIGN PATENT DOCUMENTS

| | | |
|---|---|---|
| CN | 1841960 A | 3/2005 |
| WO | WO 2006/103283 A1 | 3/2005 |

OTHER PUBLICATIONS

3GPP™; 3rd Generation Partnership Project; Technical Specification Group Radio Access Network; Evolved Universal Terrestrial Radio Access (E-UTRA); *Physical Channels and Modulation (Release 10)*; TS 36.211; V10.0.0; 102 pages.
3GPP™; 3rd Generation Partnership Project; Technical Specification Group Radio Access Network; Evolved Universal Terrestrial Radio Access (E-UTRA); *Multiplexing and Channel Coding (Release 10)*; TS 36.212; V10.0.0; 72 pages.
3GPP™; 3rd Generation Partnership Project; Technical Specification Group Radio Access Network; Evolved Universal Terrestrial Radio Access (E-UTRA); *Physical Layer Procedures (Release 10)*; TS 36.213; V10.0.0; 98 pages.

(Continued)

*Primary Examiner* — Tu X Nguyen
(74) *Attorney, Agent, or Firm* — Baker Botts L.L.P.

(57) ABSTRACT

According to one embodiment, a method includes establishing a plurality of wired connections between a plurality of nodes. The plurality of nodes include a base station and a plurality of geographically distributed remote transceivers. The base station is assigned to a first set and the base station and a first remote transceiver of the plurality of remote transceivers are assigned to a second set. Each set is configured to wirelessly transmit a respective channel reference signal. Signal quality feedback that indicates the strength of the respective channel reference signals is received from an endpoint. One of the sets is selected to use for transmitting data traffic from the base station to the endpoint based on the signal quality feedback. The method further includes transmitting data traffic from the base station to the endpoint using at least one wireless connection between the endpoint and each node of the selected set.

18 Claims, 6 Drawing Sheets

(56) References Cited

OTHER PUBLICATIONS

R1-110301; Overview of Coordinated Multi-point Operation for LTE; Motorola Mobility; Agenda Item: 6.3.1.2; 3GPP TSG RAN1 #63bis; Dublin Ireland; (3 pgs).

The State Intellectual Property Office of China, First Notification of Office Action and Search Report, and English Translation of Text of the First Office Action; Application No. 2012/10046915.7; Dispatch No. 2014/01290006690, (13 pgs).

The State Intellectual Property Office of China, Second Notification of Office Action including English Translation of Text of the Second Office Action; Application No. 2012/10046917.6; Dispatch No. 2014/091201004510, Ref. File No. 073338.0874, Sep. 17, 2014.

* cited by examiner

TRANSCEIVER SET SELECTION AND COMMUNICATION SCHEME FOR A DISTRIBUTED ANTENNA SYSTEM

RELATED APPLICATION

This application claims benefit under 35 U.S.C. §119(e) of U.S. Provisional Application Ser. No. 61/446,951, entitled "CSI-RS GROUPING SCHEME FOR DL COMP," filed Feb. 25, 2011, and U.S. Provisional Application Ser. No. 61/446,954, entitled "INTER-CELL CSI-RS GROUPING AND PDSCH TRANSMISSION," filed Feb. 25, 2011, the entire contents of which are incorporated herein by reference.

TECHNICAL FIELD

The present disclosure relates generally to methods and apparatuses for a transceiver set selection and communication scheme for a distributed antenna system.

BACKGROUND

Distributed antenna systems include a base station (also known as a Radio Element Control or a Baseband Unit) and one or more remote transceivers (also known as Radio Elements or Remote Radio Heads). These components provide endpoints with wireless network access. Within a distributed antenna system, the remote transceivers are distributed among different locations while being connected via a wired connection (e.g., optical fiber) to the base station. Each remote transceiver (or a subset thereof) transmits essentially the same core data, and the endpoint combines multiple signals from multiple remote transceivers into a single communication. The base station may communicate with the remote transceivers to facilitate transmissions between the base station and the endpoint. For example, the remote transceivers may relay control information and/or data between the base station and one or more endpoints.

A distributed antenna system may implement downlink coordinated multi-point processing (DL CoMP). DL CoMP is a special type of multiple-input and multiple-output (MIMO) transmission where multiple transmitting antennas are placed at different locations (either on a base station or a remote transceiver), while the receiving antennas are located on the endpoint. Transmissions from multiple physical antenna ports at different locations (either from different base stations or from different remote transceivers) to the same endpoint using the same physical resource blocks (PRBs) are coordinated by the transmitting base station(s) and/or remote transceiver(s).

SUMMARY OF THE DISCLOSURE

Various embodiments of the present disclosure relate to a transceiver set selection and communication scheme for a distributed antenna system. For example, in one embodiment, a method includes establishing a plurality of wired connections between a plurality of nodes. The plurality of nodes include a base station and a plurality of geographically distributed remote transceivers. The base station is assigned to a first set and the base station and a first remote transceiver of the plurality of remote transceivers are assigned to a second set. Each set is configured to wirelessly transmit a respective channel reference signal. Signal quality feedback that indicates the strength of the respective channel reference signals is received from an endpoint. One of the sets is selected to use for transmitting data traffic from the base station to the endpoint based on the signal quality feedback. The method further includes transmitting data traffic from the base station to the endpoint using at least one wireless connection between the endpoint and each node of the selected set.

BRIEF DESCRIPTION OF THE DRAWINGS

For a more complete understanding of particular embodiments and their features and advantages, reference is now made to the following description, taken in conjunction with the accompanying drawings, in which.

DETAILED DESCRIPTION OF THE DRAWINGS

Embodiments and their advantages are best understood by referring to FIGS. 1-7 of the drawings, like numerals being used for like and corresponding parts of the various drawings.

Figure 1:
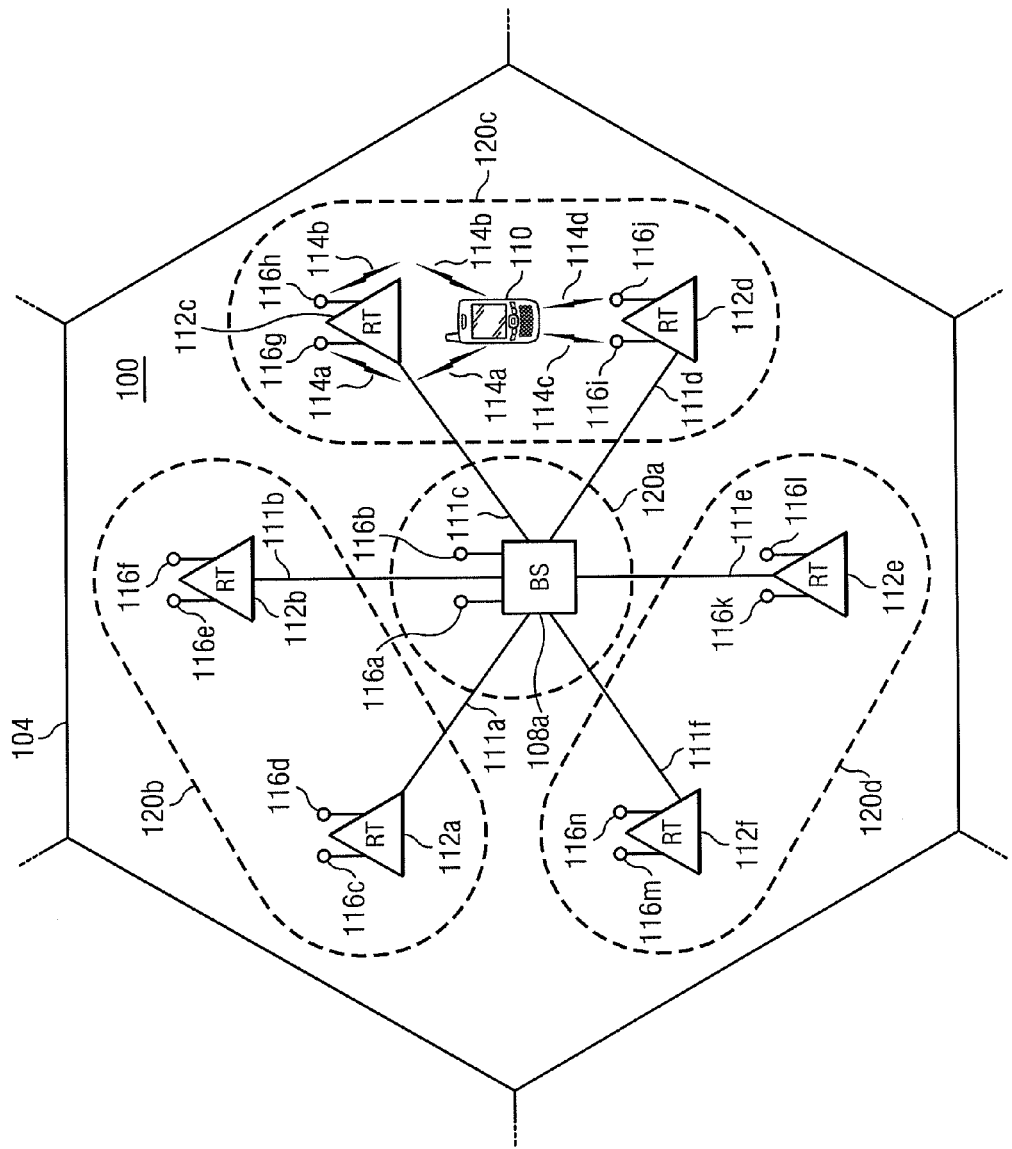
FIG. 1 depicts an example assignment of transceivers to sets in a distributed antenna system located within a single cell.

FIG. 1 depicts an example assignment of transceivers to sets 120 in a distributed antenna system 100 located within a single cell 104. The transceivers include a base station 108*a* and remote transceivers 112. The transceivers of distributed antenna system 100 communicate with one or more endpoints 110 via physical antenna ports 116. The transceivers are assigned to sets 120. A set 120 may include one or more transceivers. Each set 120 is assigned one or more logical ports that each correspond to one or more physical antenna ports 116 of the transceiver(s) of the set. If a logical port corresponds to multiple physical antenna ports 116, then each of these physical antenna ports 116 transmit the same channel reference signal. The physical antenna ports 116 of each set 120 transmit one or more channel reference signals that are distinguishable from the channel reference signals transmitted by the physical antenna ports 116 of the other sets 120. Endpoint 110 measures these channel reference signals and provides corresponding signal quality feedback to base station 108*a*. Base station 108*a* may select a particular set 120 to use for communication between base station 108*a* and endpoint 110. Base station 108*a* then communicates with endpoint 110 via one or more of the physical antenna ports 116 of the selected set 120. Sets 120 may be rearranged to tune various operating characteristics of distributed antenna system 100, such as the number of endpoints that may be served by distributed antenna system 100 or the throughput for endpoints 110 served by distributed antenna system 100.

Distributed antenna system 100 provides wireless coverage for any suitable number of endpoints 110 over a geographic area, such as cell 104. For example, a single base station (e.g., base station 108*a*) and a plurality of remote transceivers (e.g., remote transceivers 112) may be used to provide wireless coverage for an entire building, a city block, a campus, or any other area. Cell 104 may have any suitable shape, such as the honeycomb-like shape depicted in FIG. 1. Cells that are adjacent to cell 104 may include other antenna systems configured to provide service for endpoints 110 located within the boundaries of these neighboring cells. Cell 104 may be identified by a cell identifier that is assigned to the transceivers (i.e., base station 108a and remote transceivers 112a-f) located within the boundaries of cell 104. The cell identifier may include one or more numbers, letters, other identifiers, or combination thereof. The cell identifier may be included in at least a subset of transmissions from base station 108a and/or remote transceivers 112 to endpoint 110.

Base station 108a may include any combination of hardware, software embedded in a computer readable medium, and/or encoded logic incorporated in hardware or otherwise stored (e.g., firmware) to implement any number of communication protocols that allow for wired or wireless exchange of packets in distributed antenna system 100. Base station 108a may be coupled to remote transceivers 112 via wired connections 111a-f. Wired connections 111 may comprise any suitable material, such as optical fiber. Base station 108a may use any suitable wired technologies or protocols (e.g., Common Public Radio Interface (CPRI)) to communicate with remote transceivers 112 through wired connections 111.

Base station 108a may communicate with endpoint 110 via wireless communication through antennas 116a and 116b and/or through one or more antennas 116 of one or more remote transceivers 112. For example, base station 108a may send data destined for an endpoint 110 through wired connection 111 to one or more remote transceivers 112. The remote transceivers 112 then send the data to endpoint 110 via one or more wireless connections 114 between one or more physical antenna ports 116 of the remote transceivers 112 and one or more physical antenna ports of endpoint 110. As another example, data from endpoint 110 may be received through one or more wireless connections 114 between endpoint 110 and one or more physical antenna ports 116 of one or more remote transceivers 112. This data is then relayed to base station 108a by the remote transceivers 112 through one or more wired connections 111. Base station 108a may communicate with endpoint 110 using any of a variety of different wireless technologies, including, but not limited to, orthogonal frequency division multiple access (OFDMA) and the long term evolution-advanced (LTE-A) protocol as defined in the 3rd Generation Partnership Project (3GPP) Release 10 or beyond.

Although not shown in the embodiment depicted, base station 108a may also be coupled to any network or combination of networks capable of transmitting signals, data, and/or messages, including signals, data, or messages transmitted through WebPages, e-mail, text chat, voice over IP (VoIP), and instant messaging in order to provide services and data to endpoints 110. For example, base station 108a may be coupled to one or more LANs, WANs, MANs, PSTNs, WiMAX networks, global distributed networks such as the Internet, Intranet, Extranet, or any other form of wireless or wired networking. In particular embodiments, base station 108a also communicates with a base station controller that facilitates handoffs between cells and provides other functions.

A remote transceiver 112 may include any combination of hardware, software embedded in a computer readable medium, and/or encoded logic incorporated in hardware or otherwise stored (e.g., firmware) to implement any number of communication protocols that allow for the wireless exchange of packets with endpoints 110 in distributed antenna system 100. Remote transceiver may communicate with endpoint 110 using any of a variety of different wireless technologies, including, but not limited to, OFDMA and the LTE-A protocol. Remote transceivers are operable to send control signals and data traffic to endpoints 110. In certain situations, a remote transceiver 112 may function as an extension of base station 108a. For example, the remote transceiver 112 may send wireless signals to endpoint 110 that are similar to wireless signals that would be sent by base station 108a if endpoint 110 were located close to base station 108a.

Endpoint 110 may comprise any type of wireless device able to send and receive data and/or signals to and from base station 108a directly and/or via remote transceivers 112. Some examples of endpoints 110 include desktop computers, PDAs, cell phones, laptops, and/or VoIP phones. Endpoints 110 may provide data or network services to a user through any combination of hardware, software embedded in a computer readable medium, and/or encoded logic incorporated in hardware or otherwise stored (e.g., firmware). Endpoints 110 may also include unattended or automated systems, gateways, other intermediate components or other devices that may send or receive data and/or signals.

Base station 108a and remote transceivers 112 may utilize any suitable communication scheme to communicate with endpoint 110. For example, a MIMO scheme may be used that utilizes multiple physical antenna ports 116 to communicate a data stream to endpoint 110. In particular embodiments, a DL CoMP scheme is used wherein multiple physical antenna ports 116 that are located at different sites (e.g., different remote transceivers 112 or base station 108a) are used to communicate with endpoint 110 are located at different sites. Endpoint 110 may combine multiple signals from multiple remote transceivers 112 and/or base station 108a into a single communication.

Various types of information may be sent to or from endpoint 110. In particular embodiments, base station 108a generates control messages for the entire cell 104 and transmits these control messages to remote transceivers 112. These control messages may be jointly transmitted by each physical antenna port 116 of distributed antenna system 100. The control messages may include information (e.g., scheduling or demodulation information) that allows endpoint 110 to extract relevant data traffic from transmissions sent from base station 108a. In particular embodiments, these control messages conform to the LTE-A standard. For example, the control messages may include cell-specific reference signals (CRS) such as primary synchronization signal (PSS), secondary synchronization signal (SSS), physical broadcast channel (PBCH), and/or physical downlink control channel (PDCCH) reference signals.

Various other signals may be transmitted by physical antenna ports 116. For example, each physical antenna port 116 may transmit a channel reference signal, such as a channel state information reference signal (CSI-RS) as defined in LTE-A. The channel reference signal may include a sequence of values, such as a pseudo-random sequence. Endpoint 110 receives channel reference signals from various physical antenna ports 116 and provides signal quality feedback to base station 108a based on the quality (e.g., strength) of the received channel reference signals. The signal quality feedback may be used by base station 108a to select the set 120 of transceivers that is used to communicate with endpoint 110.

As depicted, transceivers 112 and 108a may be arranged into sets 120. For example, set 120a includes base station 108a, set 120b includes remote transceivers 112a and 112b, set 120c includes remote transceivers 112c and 112d, and set 120d includes remote transceivers 112e and 112f. Each set 120 may include any suitable number of transceivers 112 and/or base station 108a. After the transceivers are assigned to sets 120, one or more logical ports are assigned to each set 120. A logical port of a set 120 corresponds to one or more physical antenna ports 116 of the transceiver(s) assigned to that set. The physical antenna ports 116 of a set 120 may each transmit a channel reference signal (e.g., CSI-RS) that is based on a common sequence. The sequence and occupied resources (e.g., time, frequency, or code) used by the set 120 may be substantially the same or similar to the sequence and occupied resources used by the CSI-RS port described in 3GPP Release 10. However, at least one of the occupied resources used by a set 120 to transmit its channel reference signal is orthogonal in the time, frequency, or code domain (or any combination thereof) to the resources used by the other sets 120 to transmit their respective channel reference signals. This allows channel reference signals from different sets 120 to be distinguished by endpoint 110.

Each physical antenna port 116 of a logical port may transmit the same channel reference signal (e.g., a signal with the same sequence). In particular embodiments, a channel reference signal is produced by applying a precoding matrix to the common sequence upon which each channel reference signal for the set 120 is based. The precoding matrix used by the physical antenna ports 116 of a logical port may be fixed (i.e., each physical antenna port 116 of a particular logical port uses the same precoding matrix). Other logical ports of the same set 120 may use the same precoding matrix or a different precoding matrix. If different precoding matrices are used by logical ports of a set 120, the precoding matrices may have the same Frobenius norm.

Each logical port of a set 120 may correspond to one or more physical antenna ports 116 that have substantially the same geometric distributions as the one or more physical antenna ports of the other logical port(s) of the set. That is, if a logical port of a set 120 corresponds to one or more physical antenna ports 116 at one or more particular locations (e.g., remote transceiver 112*a*), then each other logical port of the set also corresponds to one or more different physical antenna ports 116 at the same one or more locations. Thus, the number of logical ports in a particular set 120 may be equal to the number of physical antenna ports 116 at the transceiver of the set that has the smallest number of physical antenna ports 116 (since each of these physical antenna ports 116 is included in a logical port of the set 120).

When the physical antenna ports 166 of logical ports of a set 120 have substantially the same geometric distribution and the channel reference signals of the logical ports of a set 120 are based on substantially the same sequence, the strength of a signal received at an endpoint 110 at any location within cell 104 from the physical antenna ports 116 of a logical port of a set will be substantially the same as the received signals from the physical antenna ports 116 of the other logical ports of the set. This may facilitate reuse of the existing MIMO codebook set forth in 3GPP Release 10 in the methods and systems described herein.

The configuration of the channel reference signals (e.g., the CSI-RS configuration) may be different for different sets 120 in the same cell 104. A configuration for a set 120 may specify the number of logical ports (e.g., CSI-RS ports), one or more modulation sequences, resource mapping, period of transmission, subframe offset, other suitable information, or combination thereof. The configurations may be advertised in any suitable manner, such as through control messages associated with the PBCH.

Figure 2:
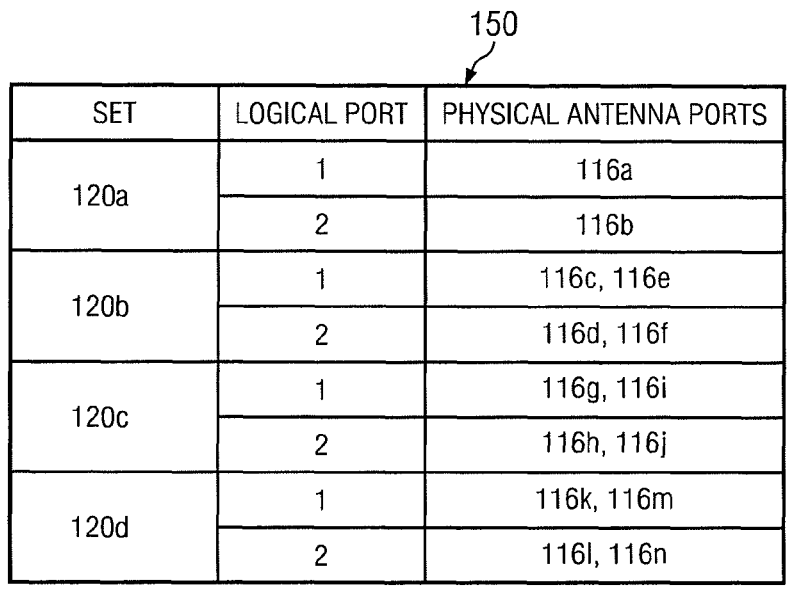
FIG. 2 depicts an example assignment table for the assignment configuration depicted in FIG. 1.

FIG. 2 depicts an example assignment table 150 for the transceiver assignment depicted in FIG. 1. Table 150 shows sets 120*a-d*, the logical ports assigned to these sets, and the physical antenna ports 116 that correspond to these logical ports. Set 120*a* includes two logical ports. The first logical port corresponds to physical antenna port 116*a* of base station 108*a* and the second logical port corresponds to physical antenna port 116*b*. Set 120*b* includes a first logical port corresponding to physical antenna port 116*c* of remote transceiver 112*a* and physical antenna port 116*e* of remote transceiver 112*b*. Set 120*b* also includes a second logical port corresponding to physical antenna port 116*d* of remote transceiver 112*a* and physical antenna port 116*f* of remote transceiver 112*b*. Set 120*c* includes a first logical port corresponding to physical antenna port 116*g* of remote transceiver 112*c* and physical antenna port 116*i* of remote transceiver 112*d*. Set 120*c* also includes a second logical port corresponding to physical antenna port 116*h* of remote transceiver 112*d* and physical antenna port 116*j* of remote transceiver 112*d*. Set 120*d* includes a first logical port corresponding to physical antenna port 116*k* of remote transceiver 112*e* and physical antenna port 116*m* of remote transceiver 112*f*. Set 120*d* also includes a second logical port corresponding to physical antenna port 116*l* of remote transceiver 112*e* and physical antenna port 116*n* of remote transceiver 112*f*.

Each set 120 shown in FIG. 1 includes logical ports having substantially the same geometric distribution of physical antenna ports 116 as the other logical port of the set 120. For example, both the first and second logical ports of set 120*b* correspond to a physical antenna port 116 at remote transceiver 112*a* and a physical antenna port 116 at remote transceiver 112*b*. Accordingly, when endpoint 110 receives a channel reference signal from the physical antenna ports 116 of the first logical port of set 120*b*, it will have substantially the same strength as a channel reference signal received from the physical antenna ports 116 of the second logical port of set 120*b*.

In particular embodiments, when a logical port corresponds to multiple physical antenna ports 116 transmitting substantially the same channel reference signal, one or more of the physical antenna ports 116 transmits the channel reference signal with a phase shift. The phase shift may be determined by a beam steering vector that may be tuned to optimize the coverage of the sets 120. In general, such tuning takes advantage of interference to change the directionality of one or more physical antenna ports 116.

Endpoint 110 of FIG. 1 is configured to receive the channel reference signals transmitted by the physical antenna ports 116 of sets 120. For a particular set 120, the channel experienced by endpoint 110 is the sum of the channel responses from each of the physical antenna ports 116 of the set 120. For each set 120, endpoint 110 may combine the channel reference signals received from the physical antenna ports 116 of the set 120 into a single signal. In fact, in certain situations, endpoint 110 may be unable to distinguish between a channel reference signal sent by a particular physical antenna port 116 of a set 120 and another physical antenna port 116 of the set 120.

Because sets 120 are distributed over the geographical area of cell 104, the strength of the channel reference signals received at endpoint 110 from various sets may be different. In general, the channel reference signal from a set 120 that includes physical antenna ports 116 that are closer to the endpoint 110 will be stronger than the channel reference signal from a set 120 that includes physical antenna ports 116 that are further from endpoint 110.

Endpoint 110 calculates signal quality feedback for each set 120 based on the quality and/or strength of the channel reference signal received from the respective set 120. In particular embodiments, the signal quality feedback calculated for a set may include one or more of a channel quality indicator (CQI), a precoding matrix indicator (PMI), or a rank indication (RI) as defined in 3GPP Release 10. After calculating the signal quality feedback, endpoint 110 reports the signal quality feedback to base station 108a. In particular embodiments, endpoint 110 reports the signal quality feedback for each set 120. In other embodiments, endpoint 110 reports signal quality feedback for a subset of sets 120. For example, endpoint 110 may report signal quality feedback for a set 120 with the strongest channel reference signal (e.g., the set 120 with the highest measured CQI) and the signal quality feedback for a set 120 with the second-strongest channel reference signal.

Base station 108a may be operable to instruct endpoint 110 regarding which sets 120 to measure and/or provide signal quality feedback for. For example, base station 108a may instruct endpoint 110 to provide signal quality feedback for the sets 120 with the strongest channel reference signals. As another example, base station 108a may instruct endpoint 110 to measure and provide signal quality feedback only for particular sets, such as sets 120b and 120c.

After receiving the signal quality feedback from endpoint 110, base station 108a makes one or more determinations based on the received signal quality feedback. For example, base station 108a may determine that a particular set 120 should be used to communicate with endpoint 110 and consequently associate the set 120 with the endpoint 110. As an example, base station 108a may determine that the set 120 that has the best signal quality feedback (e.g., strongest channel reference signal) from endpoint 110 will be used to communicate data traffic to endpoint 110. In particular embodiments, base station 108a receives signal quality feedback from multiple endpoints 110 and associates each endpoint 110 with a set 120 in order to achieve system optimality. For example, a particular endpoint 110 could be associated with the set 120 for which it measured a second-best signal quality feedback if the set 120 for which it measured the best signal quality feedback is better suited for a different endpoint 110. Multiple endpoints may be assigned to the same set 120 if time division multiple access (TDMA) or frequency division multiple access or (FDMA) is utilized.

As another example of a determination based on the received signal quality feedback, base station 108a may determine a location of endpoint 110. The location determined could be a relative location. For example, the determined location of endpoint 110 may indicate that endpoint 110 is closer to a particular remote transceiver 112a than it is to a different remote transceiver 112b or base station 108a.

As yet another example of a determination based on the received signal quality feedback, base station 108a may determine that endpoint 110 should measure and/or provide feedback for particular sets 120. In some embodiments, the particular sets 120 are chosen based on the determined location of endpoint 110. For example, base station 108a may determine that endpoint 110 should measure and/or provide feedback for the three (or other suitable number of) sets 120 that are nearest endpoint 110. Base station 108a then communicates this determination to the relevant endpoint 110 and the endpoint measures and/or provides signal quality feedback for the specified sets.

After base station 108a has selected a set 120 for communication with endpoint 110, base station 108a may communicate data traffic to endpoint 110 through the physical antenna ports 116 of the selected set 120. This may involve sending data traffic from the base station 108a to the endpoint using at least one wireless connection 114 between the endpoint 110 and at least one physical antenna port 116 of the selected set. That is, base station 108a may send the data traffic through a physical antenna port 116 of base station 108a (if base station 108a is assigned to the selected set) and/or may send the data traffic through a wired connection 111 to one or more remote transceivers 112 of the selected set and instruct the remote transceivers 112 to transmit the data traffic through the relevant physical antenna port(s) 116.

Data traffic may be distinguished from control traffic that is used to setup and maintain a connection between base station 108a and endpoint 110. For example and not by way of limitation, data traffic may include information that base station 108a receives from a network coupled to the base station 108a (such as the Internet) or from another endpoint 110 located in the same cell 104 or a different cell. In a particular embodiment, data traffic is sent to endpoint 110 via a physical downlink shared channel (PDSCH) as defined in the LTE-A protocol. In such embodiments, demodulation reference signals (DM-RS) as defined in the LTE-A protocol may be sent from the physical antenna ports 116 of the selected set 120 and used to extract the relevant data traffic from the PDSCH.

In sets that include a plurality of physical antenna ports 116, data traffic may be sent from base station 108a to endpoint 110 using a multiple-input, multiple-output (MIMO) scheme. For example, two logical ports of a set 120 could each transmit (via the one or more physical antenna ports 116 that each port corresponds to) a portion of a parallel data stream to endpoint 110. With the assignment depicted in FIG. 1, up to four endpoints 110 may be served in the same resource blocks (RB) if multi-user MIMO (MU-MIMO) is used.

Although FIG. 1 illustrates a particular number and configuration of endpoints, connections, links, and nodes, distributed antenna system 100 contemplates any number or arrangement of such components for communicating data. In addition, elements of distributed antenna system 100 may include components centrally located (local) with respect to one another or distributed throughout distributed antenna system 100.

Figure 4:
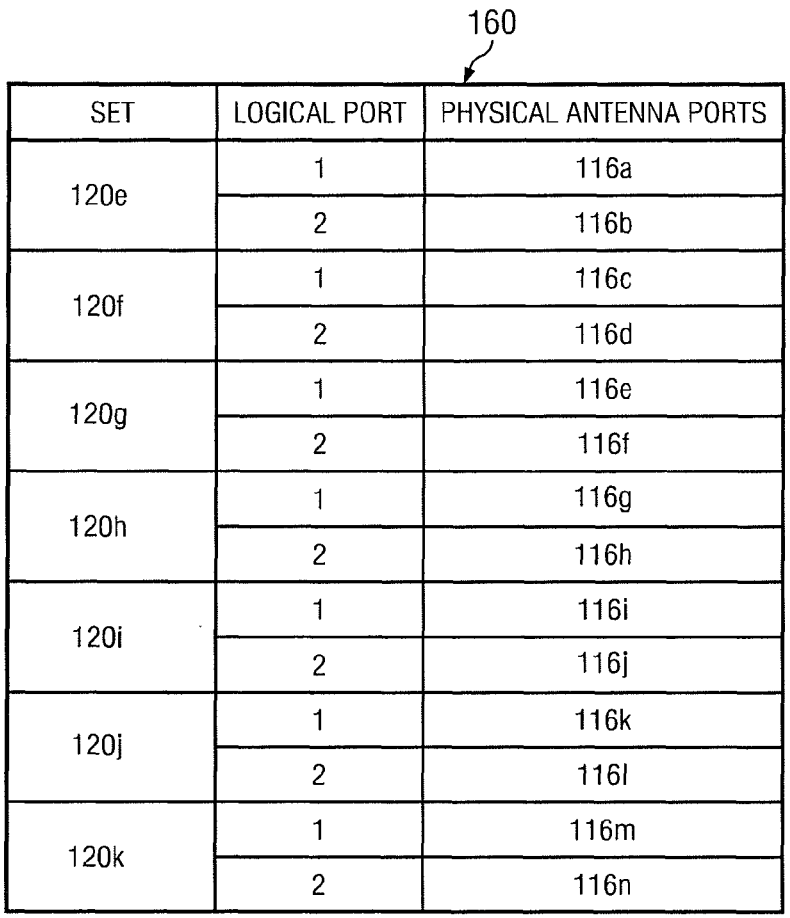
FIG. 4 depicts an example assignment table for the assignment configuration depicted in FIG. 3.
Figure 3:
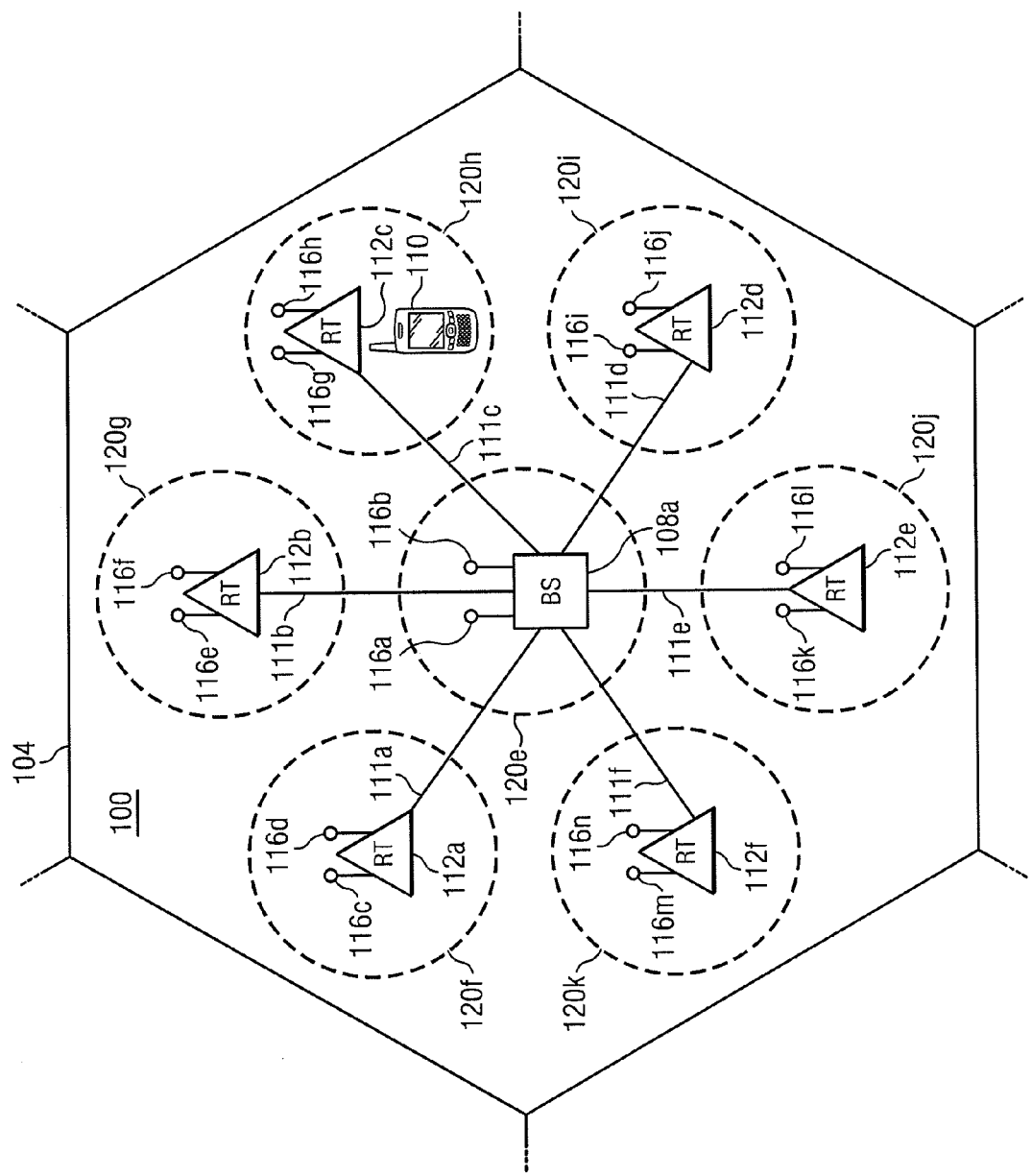
FIG. 3 depicts an alternative example assignment of transceivers to sets in a distributed antenna system of FIG. 1.

FIG. 3 depicts an alternative assignment of transceivers to sets in the distributed antenna system 100. In the embodiment depicted, each set 124 includes one transceiver (i.e., either a remote transceiver 112 or base station 108a). FIG. 4 depicts an example assignment table 160 for the assignment configuration depicted in FIG. 3. As shown in table 160, each set includes two logical ports and each logical port corresponds to one physical antenna port 116 of the transceiver of the respective set 120.

The assignment shown in FIG. 3 may allow more endpoints 110 to be serviced within cell 104 than the assignment shown in FIG. 1 because of the increased number of sets 120. For example, with the assignment depicted in FIG. 3, up to seven endpoints 110 may be served in the same RB if MU-MIMO is used by distributed antenna system 100. However, this assignment also results in increased administrative overhead in sending reference signals and receiving and processing feedback from endpoints 110. In some situations, the administrative overhead may be reduced by having one or more endpoints only report signal quality feedback for a subset of sets 120e-k. The assignment shown in FIG. 3 also provides less throughput per endpoint 110 as compared to the assignment of FIG. 1 since less physical antenna ports 116 are included in each set 120 that communicates with an endpoint 110.

The assignment of the transceivers into sets 120 may be changed at any suitable time by base station 108a. Upon determining that a change is to be made, base station 108a will notify remote transceivers 112 of such a change. For example, base station 108a may notify a remote transceiver 112 that it should use a different frequency, time, or code to send out channel reference signals from its physical antenna ports 116 if the remote transceiver 112 has been put into a different set 120 (so as not to conflict with transmissions from the other sets 120). In particular embodiments, a PBCH update from base station 108a implements a change in the configuration of sets 120.

Such an approach for assigning transceivers to sets 120, sending reference signals through the physical antenna ports 116 of the sets 120, and receiving feedback regarding the reference signals provides various advantages. For example, the coverage range and reliability of CRS and PDCCH may be increased due to joint and coherent transmission through all the physical antenna ports 116 located in cell 104. As another example, the signal strengths received at endpoint 110 from multiple physical antenna ports 116 using the same RBs to communicate with endpoint 110 are similar (i.e., there is no path loss imbalance). This simplifies reuse of the MIMO scheme described in 3GPP Release 10. The dynamic adjustability of the sets 120 allows base station 108a to configure distributed antenna system 100 to provide particular performance characteristics. For example, distributed antenna system 100 may be configured to support more endpoints 110 or to provide higher throughput to endpoints 110. Base station 108a may also tune one or more beam steering vectors of one or more physical antenna ports 116 to optimize the coverage of one or more of the sets 120 of distributed antenna system 100. Base station 108a may also select sets 120 that are optimal for communication with particular endpoints 110.

Figure 5:
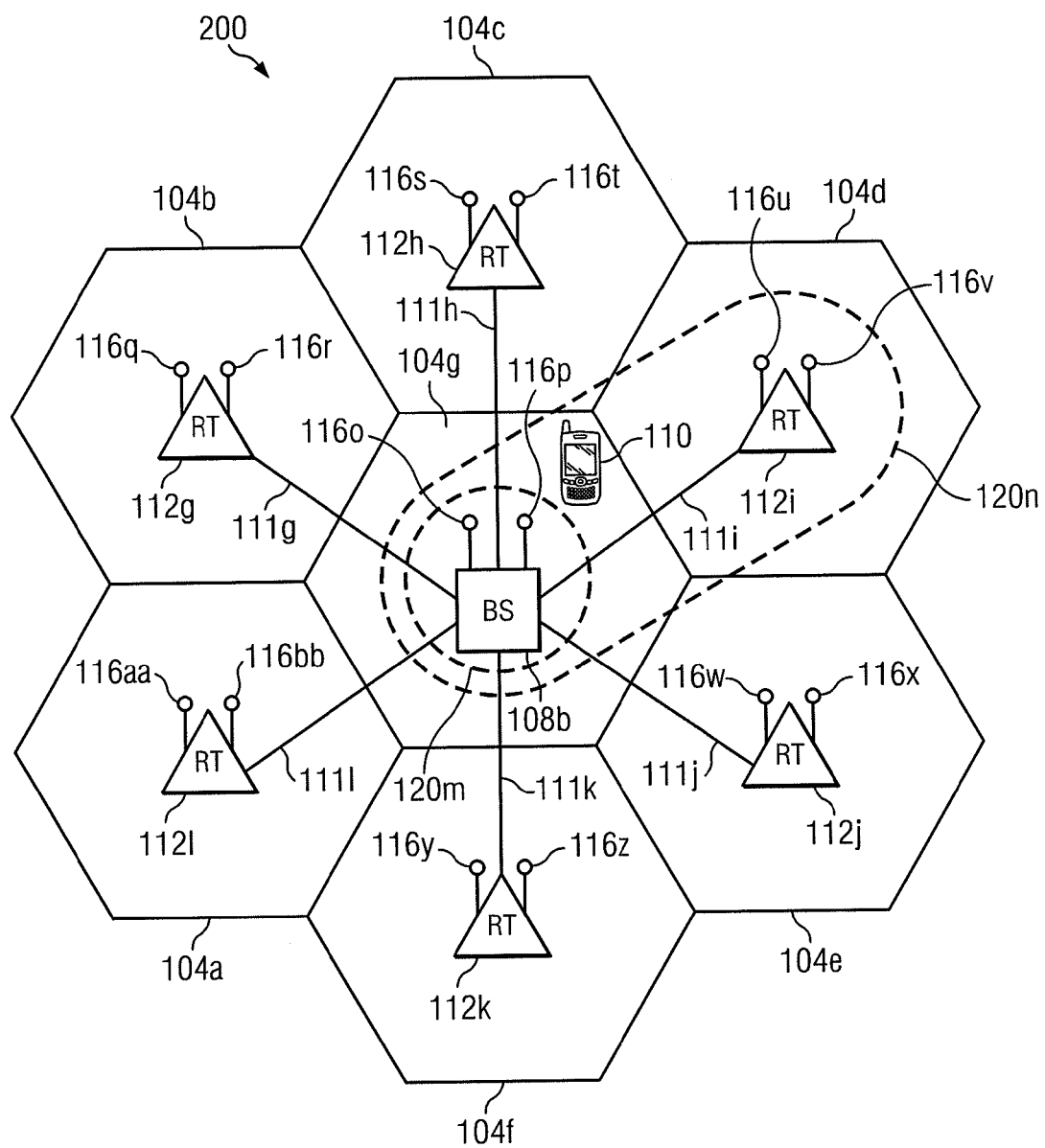
FIG. 5 depicts an example assignment of transceivers to sets in a distributed antenna system located in multiple cells.

FIG. 5 depicts an example assignment of transceivers to sets 120 in a distributed antenna system 200 located in multiple cells 104. Distributed antenna system 200 includes a plurality of transceivers (i.e., base station 108b and remote transceivers 112g-l) that are each located in one of cells 104a-104g. Each cell 104 may be identified by a cell identifier that uniquely identifies the respective cell 104. The cell identifier of each cell 104 is associated with the transceiver located within the boundaries of the respective cell 104. The respective cell identifiers may be included in at least a subset of transmissions from base station 108a or remote transceivers 112 to endpoint 110.

Base station 108b may have any one or more of the characteristics and may perform any one or more of the functions described above in connection with base station 108a. Remote transceivers 112g-l may have any one or more of the characteristics and may perform any one or more of the functions described above in connection with remote transceivers 112a-f. In particular embodiments, remote transceivers 112g-l are high power transceivers with physical antenna ports 116q-116bb having transmission ranges long enough to cover at least a substantial portion of an entire cell 104. Base station 108b may be coupled to remote transceivers 112 via wired connections 111g-l. Base station 108b may use any suitable wired technologies or protocols (e.g., CPRI) to communicate with remote transceivers 112 through wired connections 111. Although not shown, remote transceivers 112g-l may each be coupled to one or more networks (such as the Internet or one or more PSTNs) operable to provide network services and data to endpoints 110.

The transceivers may be assigned to one or more sets 120 in a manner similar to that described above in connection with FIG. 1. As described above, each set 120 includes one or more logical ports that each correspond to one or more physical antenna ports 116 of the transceiver(s) of the set. In the example depicted in FIG. 5, two sets 120 associated with cell 104g are shown. The first set 120m includes two logical ports. The first logical port includes physical antenna port 116o and the second logical port includes physical antenna port 116p. The second set associated with cell 104g is set 120n. Set 120n includes two logical ports as well. The first logical port includes physical antenna port 116o of base station 108b and physical antenna port 116u of remote transceiver 112i. The second logical port includes physical antenna port 116p of base station 108b and physical antenna port 116v of remote transceiver 112i.

In particular embodiments, each set 120 is associated with a cell identifier. A set 120 that includes transceivers from different cells 104 may be associated with the cell identifier of either cell. For example, in the embodiment depicted, set 120n includes transceivers from cell 104g (base station 108b) and cell 104d (remote transceiver 112i). In the example that will be discussed in connection with the depicted embodiment, set 120n is associated with the cell identifier for cell 104g. However, an additional set that includes the same transceivers (base station 108b and remote transceiver 112i) could be associated with the cell identifier for cell 104d.

Although not shown, base station 108b and/or remote transceivers 112g-112l could be assigned to additional sets 120. For example, base station 108b and remote transceiver 112j could be assigned to an additional set. Base station 108b could be paired with each of remote transceivers 112k, 112l, 112g, and 112h in a similar manner to form four additional sets. As another example, two or more remote transceivers 112 could be grouped together to form an additional set. As in the assignment scheme described above in connection with FIG. 1, each logical port of a particular set 120 may correspond to one or more physical antenna ports 116 that have substantially the same geometric distribution as the physical antenna ports 116 of the other logical port(s) of the set.

After sets 120 are formed, the physical antenna ports 116 of each set transmit a channel reference signal. If multiple sets 120 are associated with the same cell identifier, then the channel reference signals transmitted within each set should be orthogonal in time, frequency, or code (OCC) domain, or any combination thereof, such that the channel reference signals sent by the respective sets may be distinguished by endpoint 110. If a set 120 is associated with a cell identifier that is different from a cell identifier associated with a different set 120, the two sets may share substantially similar sequences and resources to transmit their respective channel reference signals if the channel reference signals are signaled differently (e.g., the channel reference signals may be distinguished with different configurations as described above).

For example, the physical antenna ports 116 of set 120m (i.e., physical antenna ports 116o and 116p) may transmit a first channel reference signal that is received and measured by endpoint 110. A second channel reference signal using different resources (e.g., orthogonal in time, frequency, code domain, or a combination thereof to the resources used to transmit the first channel reference signal) is transmitted by the physical antenna ports 116 of set 120n (i.e., physical antenna ports 116o, 116p, 116u, and 116v). In certain embodiments, endpoint 110 is not aware that the second channel reference signal is transmitted from transceivers located in two different cells because the transmissions are associated with the same cell identifier.

As described above, when a logical port corresponds to multiple physical antenna ports 116 transmitting the same channel reference signal, one or more of the physical antenna ports 116 may transmit the channel reference signal with a phase shift. The phase shift may be determined by a beam steering vector that may be tuned to optimize the coverage of the sets 120.

Endpoint 110 may be associated with a primary cell 104. For example, in the embodiment depicted, the primary cell associated with endpoint 110 is cell 104g. In general, the primary cell associated with endpoint 110 remains the same until endpoint 110 is handed over to a new primary cell. In certain embodiments, an endpoint 110 associated with a primary cell is configured to measure and provide feedback for channel reference signals sent from sets 120 associated with the cell identifier of the primary cell 104 and to ignore channel reference signals sent from sets that are not associated with the cell identifier of the primary cell.

In particular embodiments, the transceiver of the primary cell 104 sends certain control messages (e.g., CRS) to endpoint 110 and the transceivers of the other cells 104 do not need to send such messages. Information included in theses control messages (e.g., CRS) may be used by endpoint 110 to decode other control messages, such as control messages included in the PDCCH. In particular embodiments, endpoint 110 also receives the PDCCH from the primary cell 104g.

After receiving the signal quality feedback from endpoint 110, base station 108b makes one or more determinations based on the received signal quality feedback. For example, base station 108b may determine that a particular set 120 should be used to communicate with endpoint 110 and may consequently associate the set 120 with the endpoint 110.

In particular embodiments, base station 108b selects a set 120 that includes transceivers located in different cells 104 (such as set 120n) only if the strength of the channel reference signal from that set exceeds the strength of a channel reference signal from a set 120 that only includes base station 108b (such as set 120m) by a predetermined amount. For example, even if the CQI indicated in signal quality feedback associated with set 120n is higher than the CQI indicated in signal quality feedback associated with set 120m, base station 108b may decide to use set 120m to communicate until the CQI associated with set 120n is higher than the CQI associated with set 120m by a predetermined amount. Such embodiments may be implemented due to the increased overhead associated with communicating with an endpoint 120 through transceivers located in multiple cells 104.

Base station 108b may also determine a location of endpoint 110 based on the signal quality feedback. The location determined may be a relative location. For example, the determined location of endpoint 110 may indicate that endpoint 110 is closer to a particular remote transceiver 112i than it is to base station 108b. If base station 108b determines that endpoint 110 is close to the boundary between cells 104g and 104d, it may identify cell 104d as a candidate for handover.

Base station 108a may also determine that endpoint 110 should measure and/or provide feedback for a subset of sets 120 associated with the cell identifier of the primary cell 104. In some embodiments, the particular sets 120 are chosen based on the determined location of endpoint 110. For example, for the location of endpoint 110 shown in the embodiment depicted, base station 108b could determine that endpoint 110 should measure and/or provide feedback for set 120m and set 120n (and ignore channel reference signals from other sets having the same cell identifier). Base station 108b then communicates this determination to the relevant endpoint 110 and the endpoint measures and/or provides signal quality feedback for the specified sets.

After base station 108a has selected a set 120 for communication with endpoint 110, base station 108a may communicate data traffic to endpoint 110 through the physical antenna ports 116 of the selected set 120. For example, if set 120m is selected, base station 108a may communicate with endpoint 110 using traditional MIMO as described in 3GPP Release 10. As another example, if set 120n is selected, base station 108a and remote transceiver 112i may communicate with endpoint 110 using CoMP Joint Processing (CoMP JP). In particular embodiments, data may be communicated using a PDSCH. If the PDSCH is sent via multiple logical ports of a set 120, the DM-RS used to extract data traffic from the PDSCH may be different for each logical port, but may be based on the same DM-RS precoder matrix associated with set 120.

If endpoint 110 is subsequently handed over to a different primary cell 104 (such as cell 104d), various control messages (e.g., via a PDCCH) may be sent to endpoint 110 by remote transceiver 112i. For example, remote transceiver 112i may instruct endpoint 110 to begin measuring and providing signal quality feedback for sets 120 associated with the cell identifier of cell 104d.

Such an approach for assigning transceivers to sets 120 that may include transceivers located in distinct cells may provide various advantages. For example, a transceiver in a neighboring cell may be used to communicate with an endpoint without having to initiate a handover to the neighboring cell. As another example, path loss imbalance may be reduced or eliminated when joint processing is performed from different remote transceivers 112. This may simplify reuse of the MIMO scheme disclosed in 3GPP Release 10. As another example, signal quality feedback based on joint transmissions from multiple remote transceivers 112 in distinct cells may be more accurate than reporting signal quality feedback for the two sets separately and having base station 108b combine the two measurements. Flexible scheduling using multiple sets 120 may also be done dynamically based on endpoint locations. For example, scheduling of different transmission modes (single-site MIMO or CoMP JP) may be done using a PDCCH.

Figure 6:
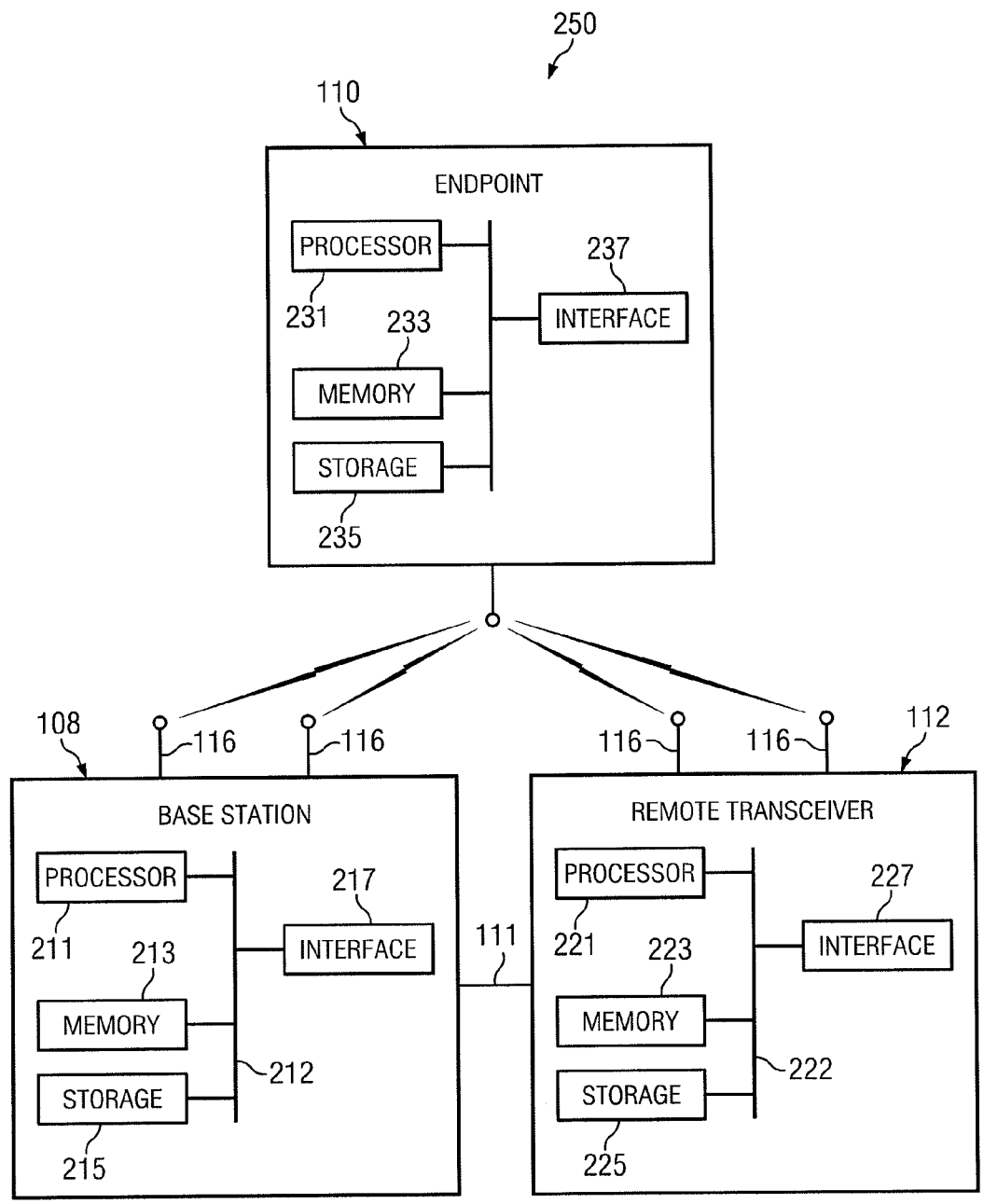
FIG. 6 depicts an example distributed antenna system including an example base station, an example remote transceiver, and an example endpoint.

FIG. 6 depicts an example distributed antenna system 250 including an example base station 108, an example remote transceiver 112, and an example endpoint 110. Distributed antenna system 250 may correspond to at least a portion of distributed antenna systems 100 or 200 of FIGS. 1, 3, and 5 or other systems. Base station 108, remote transceivers 112, and endpoints 110 may each include one or more portions of one or more computer systems. In particular embodiments, one or more of these computer systems may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of base station 108, remote transceiver 112, and endpoint 110 may comprise any suitable physical form, configuration, number, type and/or layout. As an example, and not by way of limitation, base station 108, remote transceiver 112, and/or endpoint 110 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, base station 108, remote transceiver 112, and/or endpoint 110 may include one or more computer systems; be unitary or distributed; span multiple locations; span multiple machines; or reside in a cloud, which may include one or more cloud components in one or more networks.

In the depicted embodiment, base station 108, remote transceiver 112, and endpoint 110 each include their own respective processors 211, 221, and 231; memory 213, 223, and 233; storage 215, 225, and 235; interfaces 217, 227, and 237; and buses 212, 222, and 232. Although a particular distributed antenna system is depicted having a particular number of particular components in a particular arrangement, this disclosure contemplates any suitable distributed antenna system 250 having any suitable number of any suitable components in any suitable arrangement. For simplicity, similar components of base station 108, remote transceiver 112, and endpoint 110 will be discussed together while referring to the component of base station 108. However, it is not necessary for these devices to have the same components, or the same type of components. For example, processor 211 may be a general purpose microprocessor and processor 221 may be an application specific integrated circuit (ASIC).

Processor 211 may be a microprocessor, controller, or any other suitable computing device, resource, or combination of hardware, software and/or encoded logic operable to provide, either alone or in conjunction with other components, (e.g., memory 213) wireless networking functionality. Such functionality may include providing various wireless features discussed herein. For example, processor 211 may determine how to assign transceivers to sets 120. Additional examples and functionality provided, at least in part, by processor 211 will be discussed below.

In particular embodiments, processor 211 may include hardware for executing instructions, such as those making up a computer program. As an example and not by way of limitation, to execute instructions, processor 211 may retrieve (or fetch) instructions from an internal register, an internal cache, memory 213, or storage 215; decode and execute them; and then write one or more results to an internal register, an internal cache, memory 213, or storage 215.

In particular embodiments, processor 211 may include one or more internal caches for data, instructions, or addresses. This disclosure contemplates processor 211 including any suitable number of any suitable internal caches, where appropriate. As an example and not by way of limitation, processor 211 may include one or more instruction caches, one or more data caches, and one or more translation lookaside buffers (TLBs). Instructions in the instruction caches may be copies of instructions in memory 213 or storage 215 and the instruction caches may speed up retrieval of those instructions by processor 211. Data in the data caches may be copies of data in memory 213 or storage 215 for instructions executing at processor 211 to operate on; the results of previous instructions executed at processor 211 for access by subsequent instructions executing at processor 211, or for writing to memory 213, or storage 215; or other suitable data. The data caches may speed up read or write operations by processor 211. The TLBs may speed up virtual-address translations for processor 211. In particular embodiments, processor 211 may include one or more internal registers for data, instructions, or addresses. Depending on the embodiment, processor 211 may include any suitable number of any suitable internal registers, where appropriate. Where appropriate, processor 211 may include one or more arithmetic logic units (ALUs); be a multi-core processor; include one or more processors 211; or any other suitable processor.

Memory 213 may be any form of volatile or non-volatile memory including, without limitation, magnetic media, optical media, random access memory (RAM), read-only memory (ROM), flash memory, removable media, or any other suitable local or remote memory component or components. In particular embodiments, memory 213 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 213 may include one or more memories 213, where appropriate. Memory 213 may store any suitable data or information utilized by base station 108, including software embedded in a computer readable medium, and/or encoded logic incorporated in hardware or otherwise stored (e.g., firmware). In particular embodiments, memory 213 may include main memory for storing instructions for processor 211 to execute or data for processor 211 to operate on. In particular embodiments, one or more memory management units (MMUs) may reside between processor 211 and memory 213 and facilitate accesses to memory 213 requested by processor 211.

As an example and not by way of limitation, base station 108 may load instructions from storage 215 or another source (such as, for example, another computer system, another base station, or a remote transceiver) to memory 213. Processor 211 may then load the instructions from memory 213 to an internal register or internal cache. To execute the instructions, processor 211 may retrieve the instructions from the internal register or internal cache and decode them. During or after execution of the instructions, processor 211 may write one or more results (which may be intermediate or final results) to the internal register or internal cache. Processor 211 may then write one or more of those results to memory 213. In particular embodiments, processor 211 may execute only instructions in one or more internal registers or internal caches or in memory 213 (as opposed to storage 215 or elsewhere) and may operate only on data in one or more internal registers or internal caches or in memory 213 (as opposed to storage 215 or elsewhere).

In particular embodiments, storage 215 may include mass storage for data or instructions. As an example and not by way of limitation, storage 215 may include a hard disk drive (HDD), a floppy disk drive, flash memory, an optical disc, a magneto-optical disc, magnetic tape, or a Universal Serial Bus (USB) drive or a combination of two or more of these. Storage 215 may include removable or non-removable (or fixed) media, where appropriate. Storage 215 may be internal or external to base station 108, where appropriate. In particular embodiments, storage 215 may be non-volatile, solid-state memory. In particular embodiments, storage 215 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 215 may take any suitable physical form and may comprise any suitable number or type of storage. Storage 215 may include one or more storage control units facilitating communication between processor 211 and storage 215, where appropriate.

In particular embodiments, interface 217 may include hardware, encoded software, or both providing one or more interfaces for communication (such as, for example, packet-based communication) between base station 108, remote transceivers 112, endpoints 110, any networks, any network devices, and/or any other computer systems. As an example and not by way of limitation, communication interface 217 may include a network interface controller (NIC) or network adapter for communicating with an Ethernet or other wire-based network and/or a wireless NIC (WNIC) or wireless adapter for communicating with a wireless network.

In some embodiments, interface 217 comprises one or more radios coupled to one or more physical antenna ports 116. In such an embodiment, interface 217 (and/or 227) receives digital data that is to be sent out to wireless devices, such as endpoints 110, via a wireless connection. The radio may convert the digital data into a radio signal having the appropriate center frequency, bandwidth parameters, and transmission power. The power distribution for the radio signal may have been determined and applied to each subcarrier at base station 108, or the power distribution may be determined at base station 108 and applied by remote transceivers 112. Similarly, the radios may convert radio signals received via one or more receiving antennas into digital data to be processed by, for example, processor 211.

Depending on the embodiment, interface 217 may be any type of interface suitable for any type of network for which distributed antenna system 250 is used. As an example and not by way of limitation, distributed antenna system 250 may communicate with an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, distributed antenna system 250 may communicate with a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. Base station 108 may include any suitable interface 217 for any one or more of these networks, where appropriate.

In some embodiments, interface 217 may include one or more interfaces for one or more I/O devices. One or more of these I/O devices may enable communication between a person and base station 108. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 117 for them. Where appropriate, interface 117 may include one or more drivers enabling processor 211 to drive one or more of these I/O devices. Interface 117 may include one or more interfaces 117, where appropriate.

Bus 212 may include any combination of hardware, software embedded in a computer readable medium, and/or encoded logic incorporated in hardware or otherwise stored (e.g., firmware) to couple components of base station 108 to each other. As an example and not by way of limitation, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 212 may include any number, type, and/or configuration of buses 212, where appropriate. In particular embodiments, one or more buses 212 (which may each include an address bus and a data bus) may couple processor 211 to memory 213. Bus 212 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 211 (such as, for example, one or more internal registers or caches), one or more portions of memory 213, one or more portions of storage 215, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Figure 7:
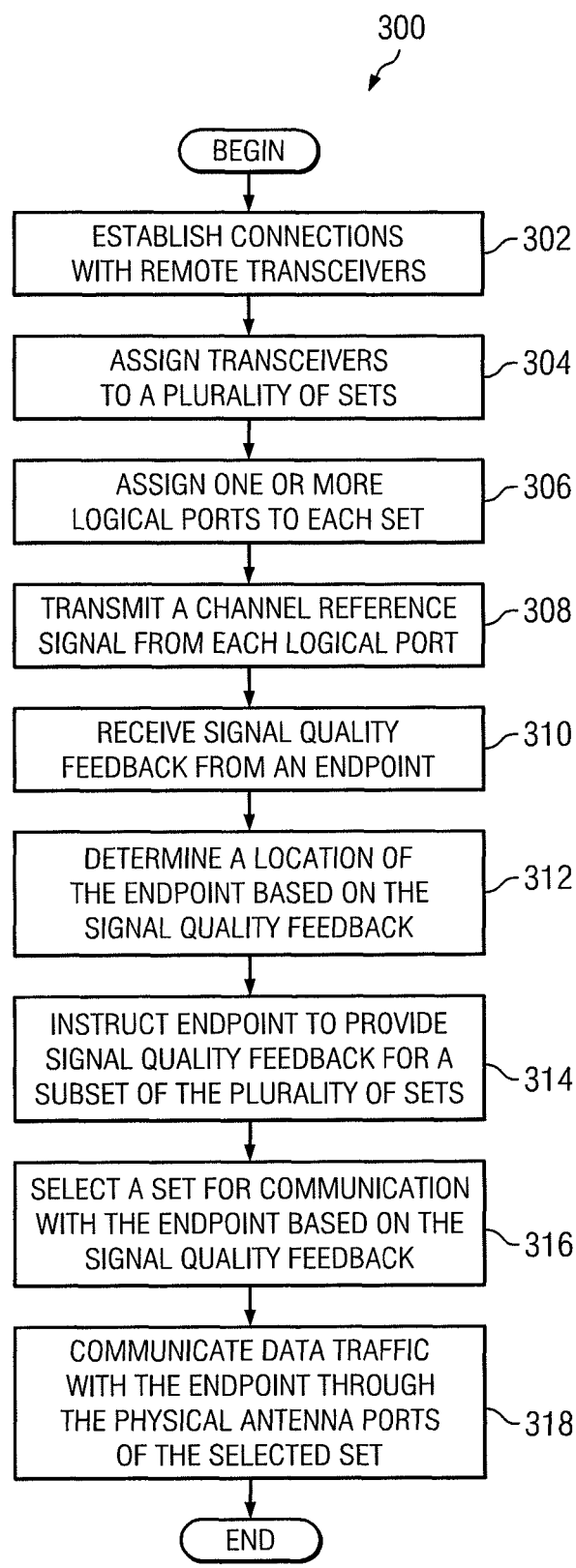
FIG. 7 depicts an example method 300 for operating the distributed antenna systems of FIGS. 1, 3, and 5.

FIG. 7 depicts an example method 300 for operating a distributed antenna system comprising a plurality of sets 120, such as distributed antenna system 100 or 200. For purposes of simplicity, the illustrated steps of method 300 are described from the perspective of a base station 108. The base station is responsible for managing a plurality of remote transceivers 112 in a wireless network of distributed antenna systems comprising other base stations managing other remote transceivers.

The method begins at step 302 where connections between a base station 108 and a plurality of remote transceivers 212 is established. In particular embodiments, the connections comprise wired connections between the base station 108 and each remote transceiver 112. In some embodiments, the connections between the base station 108 and the plurality of remote transceivers 112 comprise a CPRI connection. Depending on the embodiment, the plurality of remote transceivers 112 are arranged in a cascaded topology, a star topology, a tree topology, ring topology, or other suitable topology.

At step 304, the transceivers are assigned to a plurality of sets 120. The transceivers that are assigned may include one or more remote transceivers and base station 108. Each set 120 may include one or more transceivers. At step 306, one or more logical ports is assigned to each set 120. Each logical port may correspond to one or more physical antenna ports 116 of a transceiver assigned to the same set as the logical port. A logical port may correspond to a single physical antenna port 116 or multiple physical antenna ports 116 that transmit the same channel reference signal.

At step 308, a channel reference signal is transmitted from each logical port of each set 120. That is, the channel reference signal of a logical port is transmitted by the one or more physical antenna ports 116 to which the logical port corresponds. The channel reference signals may be transmitted at specified intervals and may be transmitted using particular resources (e.g., time, frequency, or code). The channel reference signals transmitted by logical ports of the same set 120 may use the same resources, while the channel reference signals transmitted by logical ports of different sets 120 may use different resources if they are associated with the same cell identifier. In certain embodiments, channel reference signals transmitted by logical ports of different sets 120 that are associated with different cell identifiers may use the same resources.

At step 310, signal quality feedback is received from an endpoint 110. The endpoint 110 measures the channel reference signals sent by the logical ports of each set 120 and provides signal quality feedback particular to each set. The signal quality feedback for a set 120 may indicate the strength of the channel reference signal received from the logical ports of the set 120. The endpoint 110 sends the signal quality feedback to the base station 108. In particular embodiments, endpoint 110 is configured to only measure channel reference signals from logical ports of sets 120 associated with the primary cell of endpoint 110.

At step 312, a location of the endpoint 110 is determined based on the signal quality feedback. For example, base station 108 may determine that endpoint 110 is located close to a particular transceiver or group of transceivers or near a boundary between two or more transceivers. At step 314, the endpoint 110 is instructed to provide signal quality feedback for a subset of the plurality of sets 120. For example, endpoint 110 may be instructed to provide signal quality feedback for the two sets with the best signal quality feedback.

At step 316, a set is selected for communication with the endpoint 110 based on the signal quality feedback. For example, if the signal quality feedback indicates that a channel reference signal from a particular set 120 was the strongest of the channel reference signals measured by endpoint 110, the particular set may be selected for communication with the endpoint 110. At step 318, data traffic is communicated with the endpoint 110 through the physical antenna ports 116 of the selected set. For example, a MIMO scheme may be used to transmit data traffic from the physical antenna ports 116 of the selected set via a PDSCH.

Some of the steps illustrated in FIG. 7 may be combined, modified or deleted where appropriate, and additional steps may also be added to the flowchart. Additionally, steps may be performed in any suitable order without departing from the scope of particular embodiments.

Technical advantages of particular embodiments include communication of data traffic to an endpoint utilizing a base station and a remote transceiver located in different cells. Another technical advantage of particular embodiments is that a set of transceivers may be selected from a plurality of sets to use for communication between a base station and an endpoint. Another technical advantage of particular embodiments is that the relative phase between transmissions by physical antenna ports of transceivers may be changed to optimize coverage or throughput. Other technical advantages will be readily apparent to one of ordinary skill in the art from the following figures, descriptions, and claims. Moreover, while specific advantages have been enumerated above, various embodiments may include all, some, or none of the enumerated advantages.

While various implementations and features are discussed with respect to multiple embodiments, it should be understood that such implementations and features may be combined in various embodiments. For example, features and functionality discussed with respect to a particular figure, such as FIG. 6, may be used in connection with features and functionality discussed with respect to another such figure, such as FIG. 1, 3 or 5, according to operational needs or desires.

Although particular embodiments have been described in detail, it should be understood that various other changes, substitutions, and alterations may be made hereto without departing from the spirit and scope of particular embodiments. For example, although an embodiment has been described with reference to a number of elements included within base station 108 such as a processor, memory, storage, an interface, and a bus, these elements may be combined, rearranged or positioned in order to accommodate particular wireless architectures or needs. In addition, any of these elements may be provided as separate external components to base station 108 or each other where appropriate. Particular embodiments contemplate great flexibility in the arrangement of these elements as well as their internal components.

Numerous other changes, substitutions, variations, alterations and modifications may be ascertained by those skilled in the art and it is intended that particular embodiments encompass all such changes, substitutions, variations, alterations and modifications as falling within the spirit and scope of the appended claims.

What is claimed is:

1. A base station comprising:
an interface configured to:
 establish a plurality of wired connections between a plurality of nodes that are each located in a distinct cell and associated with a distinct cell identifier, the plurality of nodes including the base station and a plurality of remote transceivers; and
a processor coupled to the interface and configured to:
 assign the base station to a first set of a plurality of sets;
 assign the base station and a first remote transceiver of the plurality of remote transceivers to a second set of the plurality of sets;
 configure the base station of the first set to wirelessly transmit a first channel reference signal;
 configure the base station and the first remote transceiver of the second set to wirelessly transmit a second channel reference signal using a first wireless signal that is orthogonal with respect to a second wireless signal used by the first set to transmit the first channel reference signal;

receive signal quality feedback from an endpoint for the first set and the second set, the signal quality feedback for the first set including a measurement of the strength of the first channel reference signal, the signal quality feedback for the second set including a measurement of the strength of the second channel reference signal;

select one of the first set or the second set to use for transmitting data traffic from the base station to the endpoint, the selection based on the signal quality feedback;

wherein the interface is further configured to transmit data traffic from the base station to the endpoint using at least one wireless connection between the endpoint and each node of the selected set; and wherein the first set is selected unless the signal quality feedback indicates that the strength of the second channel reference signal is greater than the strength of the first channel reference signal by a predetermined amount, the predetermined amount equal to or greater than 0.5 percent of the strength of the first channel reference signal.

2. The base station of claim 1, wherein the processor is further configured to:

assign the base station and a second remote transceiver of the plurality of remote transceivers to a third set of the plurality of sets; and configure the base station and the second remote transceiver of the third set of the plurality of sets to wirelessly transmit a third channel reference signal.

3. The base station of claim 1, wherein the processor is further configured to:

assign a plurality of logical ports to the second set, each logical port of the plurality of logical ports corresponding to a physical antenna port of the base station and a physical antenna port of the first remote transceiver; and split a data traffic stream among the plurality of logical ports for transmission to the endpoint if the second set is selected for transmitting data traffic from the base station to the endpoint.

4. The base station of claim 1, wherein the processor is further configured to:

determine a location of the endpoint based on the received signal quality feedback from the endpoint; and transmit a request requesting that the endpoint provide signal quality feedback with respect to a specified subset of the plurality of sets.

5. The base station of claim 1, wherein the processor is further configured to tune a beam steering vector based on the signal quality feedback received from the endpoint, the beam steering vector tuned to improve at least one of the coverage range of the first set or the second set.

6. A method, comprising:

establishing a plurality of wired connections between a plurality of nodes, the plurality of nodes including a base station and a plurality of geographically distributed remote transceivers;

assigning the base station to a first set of a plurality of sets;

assigning the base station and a first remote transceiver of the plurality of remote transceivers to a second set of the plurality of sets;

configuring the base station of the first set to wirelessly transmit a first channel reference signal;

configuring the base station and the first remote transceiver of the second set to wirelessly transmit a second channel reference signal;

receiving signal quality feedback from an endpoint for the first set and the second set, the signal quality feedback for the first set including a measurement of the strength of the first channel reference signal, the signal quality feedback for the second set including a measurement of the strength of the second channel reference signal;

selecting one of the first set or the second set to use for transmitting data traffic from the base station to the endpoint, the selection based on the signal quality feedback;

transmitting data traffic from the base station to the endpoint using at least one wireless connection between the endpoint and each node of the selected set; and wherein the first set is selected unless the signal quality feedback indicates that the strength of the second channel reference signal is greater than the strength of the first channel reference signal by a predetermined amount, the predetermined amount equal to or greater than 0.5 percent of the strength of the first channel reference signal.

7. The method of claim 6, wherein the base station and each remote transceiver of the plurality of remote transceivers are each located in a distinct cell and are each associated with a distinct cell identifier.

8. The method of claim 6, further comprising:

assigning the base station and a second remote transceiver of the plurality of remote transceivers to a third set of the plurality of sets; and configuring the base station and the second remote transceiver of the third set of the plurality of sets to wirelessly transmit a third channel reference signal.

9. The method of claim 6, further comprising:

assigning a plurality of logical ports to the second set, each logical port of the plurality of logical ports corresponding to a physical antenna port of the base station and a physical antenna port of the first remote transceiver; and splitting a data traffic stream among the plurality of logical ports for transmission to the endpoint if the second set is selected for transmitting data traffic from the base station to the endpoint.

10. The method of claim 6, further comprising:

determining a location of the endpoint based on the received signal quality feedback from the endpoint; and transmitting a request requesting that the endpoint provide signal quality feedback with respect to a specified subset of the plurality of sets.

11. The method of claim 6, further comprising tuning a beam steering vector based on the signal quality feedback received from the endpoint, the beam steering vector tuned to improve at least one of the coverage range of the first set or the second set.

12. The method of claim 6, wherein the first set transmits the first channel reference signal using a first wireless signal that is orthogonal with respect to a second wireless signal used by the second set to transmit the second channel reference signal.

13. One or more non-transitory computer-readable storage media embodying logic that when executed by a processor is configured to:

establish a plurality of wired connections between a plurality of nodes, the plurality of nodes including a base station and a plurality of geographically distributed remote transceivers;

assign the base station to a first set of a plurality of sets;

assign the base station and a first remote transceiver of the plurality of remote transceivers to a second set of the plurality of sets;

configure the base station of the first set to wirelessly transmit a first channel reference signal;

configure the base station and the first remote transceiver of the second set to wirelessly transmit a second channel reference signal;

receive signal quality feedback from an endpoint for the first set and the second set, the signal quality feedback for the first set including a measurement of the strength of the first channel reference signal, the signal quality feedback for the second set including a measurement of the strength of the second channel reference signal;

select one of the first set or the second set to use for transmitting data traffic from the base station to the endpoint, the selection based on the signal quality feedback; and transmit data traffic from the base station to the endpoint using at least one wireless connection between the endpoint and each node of the selected set; and wherein the first set is selected unless the signal quality feedback indicates that the strength of the second channel reference signal is greater than the strength of the first channel reference signal by a predetermined amount, the predetermined amount equal to or greater than 0.5 percent of the strength of the first channel reference.

14. The media of claim 13, wherein the base station and each remote transceiver of the plurality of remote transceivers are each located in a distinct cell and are each associated with a distinct cell identifier.

15. The media of claim 13, the logic further configured to:
assign the base station and a second remote transceiver of the plurality of remote transceivers to a third set of the plurality of sets; and
configure the base station and the second remote transceiver of the third set of the plurality of sets to wirelessly transmit a third channel reference signal.

16. The media of claim 13, the logic further configured to:
assign a plurality of logical ports to the second set, each logical port of the plurality of logical ports corresponding to a physical antenna port of the base station and a physical antenna port of the first remote transceiver; and
split a data traffic stream among the plurality of logical ports for transmission to the endpoint if the second set is selected for transmitting data traffic from the base station to the endpoint.

17. The media of claim 13, the logic further configured to:
determine a location of the endpoint based on the received signal quality feedback from the endpoint; and
transmit a request requesting that the endpoint provide signal quality feedback with respect to a specified subset of the plurality of sets.

18. The media of claim 13, the logic further configured to tune a beam steering vector based on the signal quality feedback received from the endpoint, the beam steering vector tuned to improve at least one of the coverage range of the first set or the second set.

\* \* \* \* \*